(12) United States Patent
Vossler et al.

(10) Patent No.: US 10,487,798 B2
(45) Date of Patent: Nov. 26, 2019

(54) SYSTEM AND METHOD FOR LOCATING AIRFLOW MODIFIERS FOR INSTALLATION ON A WIND TURBINE ROTOR BLADE

(71) Applicant: General Electric Company, Schenectady, NY (US)

(72) Inventors: Alexander William Vossler, Greenville, SC (US); Ryan Spencer Close, Greenville, SC (US)

(73) Assignee: General Electric Company, Schenectady, NY (US)

( * ) Notice: Subject to any disclaimer, the term of this patent is extended or adjusted under 35 U.S.C. 154(b) by 433 days.

(21) Appl. No.: 15/229,226

(22) Filed: Aug. 5, 2016

(65) Prior Publication Data

US 2018/0038343 A1 Feb. 8, 2018

(51) Int. Cl.
*F03D 1/06* (2006.01)
*B23P 15/04* (2006.01)
*F03D 9/25* (2016.01)

(52) U.S. Cl.
CPC ............ *F03D 1/0675* (2013.01); *B23P 15/04* (2013.01); *F03D 9/25* (2016.05); *F05B 2220/30* (2013.01);
(Continued)

(58) Field of Classification Search
CPC ........ F05B 2230/604; F05B 2240/2211; F05B 2240/122; F05B 2230/60; F05B 2220/30;
(Continued)

(56) References Cited

U.S. PATENT DOCUMENTS 6,540,288 B1 4/2003 Tobin
7,387,491 B2 * 6/2008 Saddoughi ............ F03D 1/0608
415/914
(Continued)

FOREIGN PATENT DOCUMENTS

CN 205349619 U 6/2016
EP 2548801 A1 1/2013
(Continued)

OTHER PUBLICATIONS

Extended European Search Report and Opinion issued in connection with corresponding EP Application No. 17184687.6 dated Jan. 3, 2018.
(Continued)

*Primary Examiner* — Sarang Afzali
(74) *Attorney, Agent, or Firm* — Dority & Manning, P.A.

(57) ABSTRACT

A system for locating airflow modifiers for installation on wind turbine rotor blades may generally include a plurality of airflow modifiers, with each airflow modifier including a base defining an outer profile that differs from the outer profiles of the remainder of the airflow modifiers. The system may also include a blade shell defining an exterior surface. The base of each airflow modifier may be configured to be coupled to the exterior surface of the blade shell. In addition, the system may include an installation template provided on the exterior surface of the blade shell. The installation template may define a different installation location for each of the airflow modifiers. Moreover, the installation template may include a geometric feature at each installation location that at least partially matches the outer profile of the airflow modifier configured to be installed at such installation location.

17 Claims, 10 Drawing Sheets

(52) U.S. Cl.
CPC ..... *F05B 2230/60* (2013.01); *F05B 2240/122* (2013.01); *F05B 2240/2211* (2013.01); *F05B 2240/30* (2013.01); *Y10T 29/4978* (2015.01); *Y10T 29/49337* (2015.01)

(58) Field of Classification Search
CPC ...... F05B 2240/30; F03D 1/0675; F03D 9/25; B23P 15/04; B23P 15/02; B64C 11/24; B64C 2027/4736; F05D 2230/60; Y02P 70/523; Y02E 10/721; Y10T 29/49337; Y10T 29/4978; Y10T 29/49778
See application file for complete search history.

(56) References Cited

U.S. PATENT DOCUMENTS

| | | | |
|---|---|---|---|
| 7,748,958 B2* | 7/2010 | McVeigh | B64C 23/06 415/119 |
| 7,909,576 B1 | 3/2011 | van der Bos | |
| 8,047,804 B2 | 11/2011 | Bagepalli | |
| 8,162,590 B2 | 4/2012 | Haag | |
| 8,746,053 B2* | 6/2014 | Brake | F03D 1/0608 73/147 |
| 9,133,816 B2* | 9/2015 | Jensen | F03D 1/0608 |
| 9,562,513 B2 | 2/2017 | Tobin et al. | |
| 9,759,186 B2* | 9/2017 | Grabau | F03D 1/0633 |
| 2008/0317600 A1 | 12/2008 | Enevoldsen et al. | |
| 2009/0068018 A1 | 3/2009 | Corten | |
| 2010/0143144 A1 | 6/2010 | Anjuri et al. | |
| 2012/0134817 A1 | 5/2012 | Bagepalli et al. | |
| 2012/0151769 A1 | 6/2012 | Brake et al. | |
| 2012/0201690 A1 | 8/2012 | Fuglsang | |
| 2012/0257977 A1 | 10/2012 | Jensen | |
| 2013/0156593 A1 | 6/2013 | Gupta | |
| 2014/0328687 A1 | 11/2014 | Tobin et al. | |
| 2014/0328692 A1* | 11/2014 | Riddell | F03D 1/0675 416/236 R |
| 2018/0038342 A1 | 2/2018 | Tobin et al. | |

FOREIGN PATENT DOCUMENTS

| | | |
|---|---|---|
| EP | 2 799 709 A1 | 11/2014 |
| WO | WO 2008113349 A2 | 9/2008 |
| WO | 2016/020431 A1 | 2/2016 |

OTHER PUBLICATIONS

European Search Report and Opinion issued in connection with corresponding EP Application No. 14166768.3 dated Dec. 18, 2014 (5 pages).

* cited by examiner

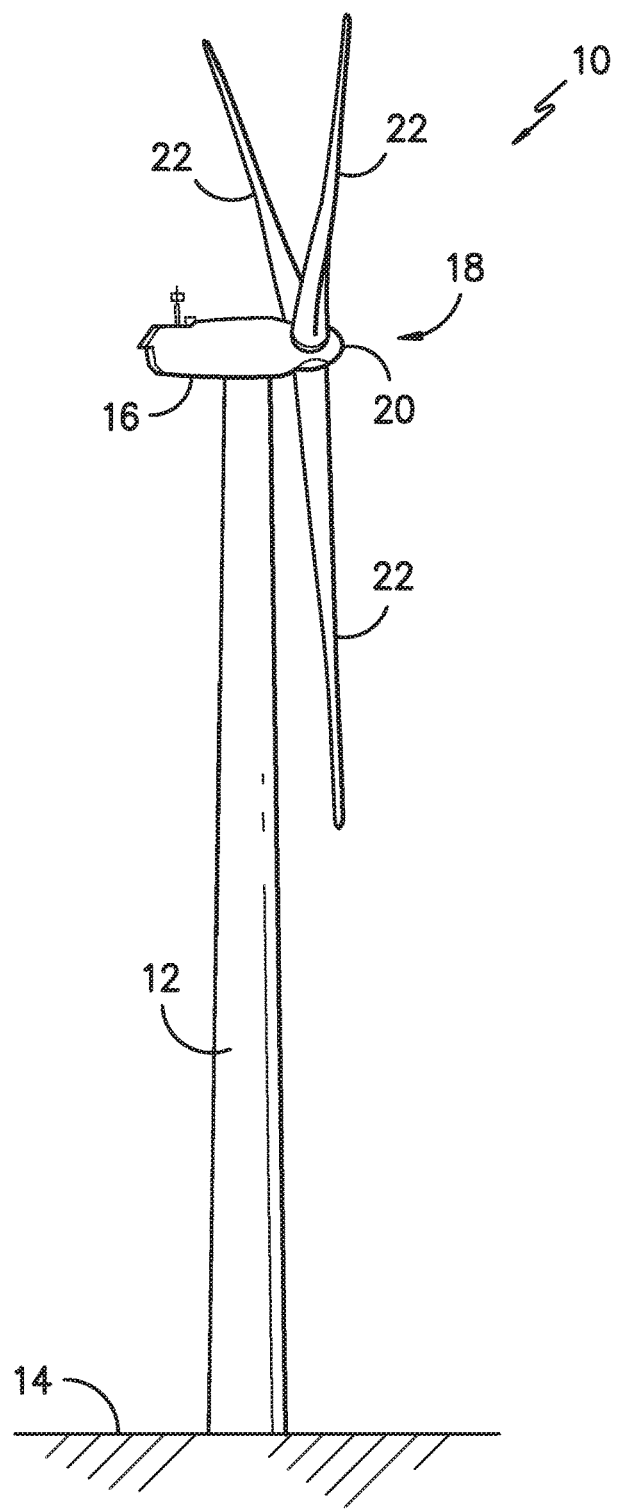
FIG. -1-

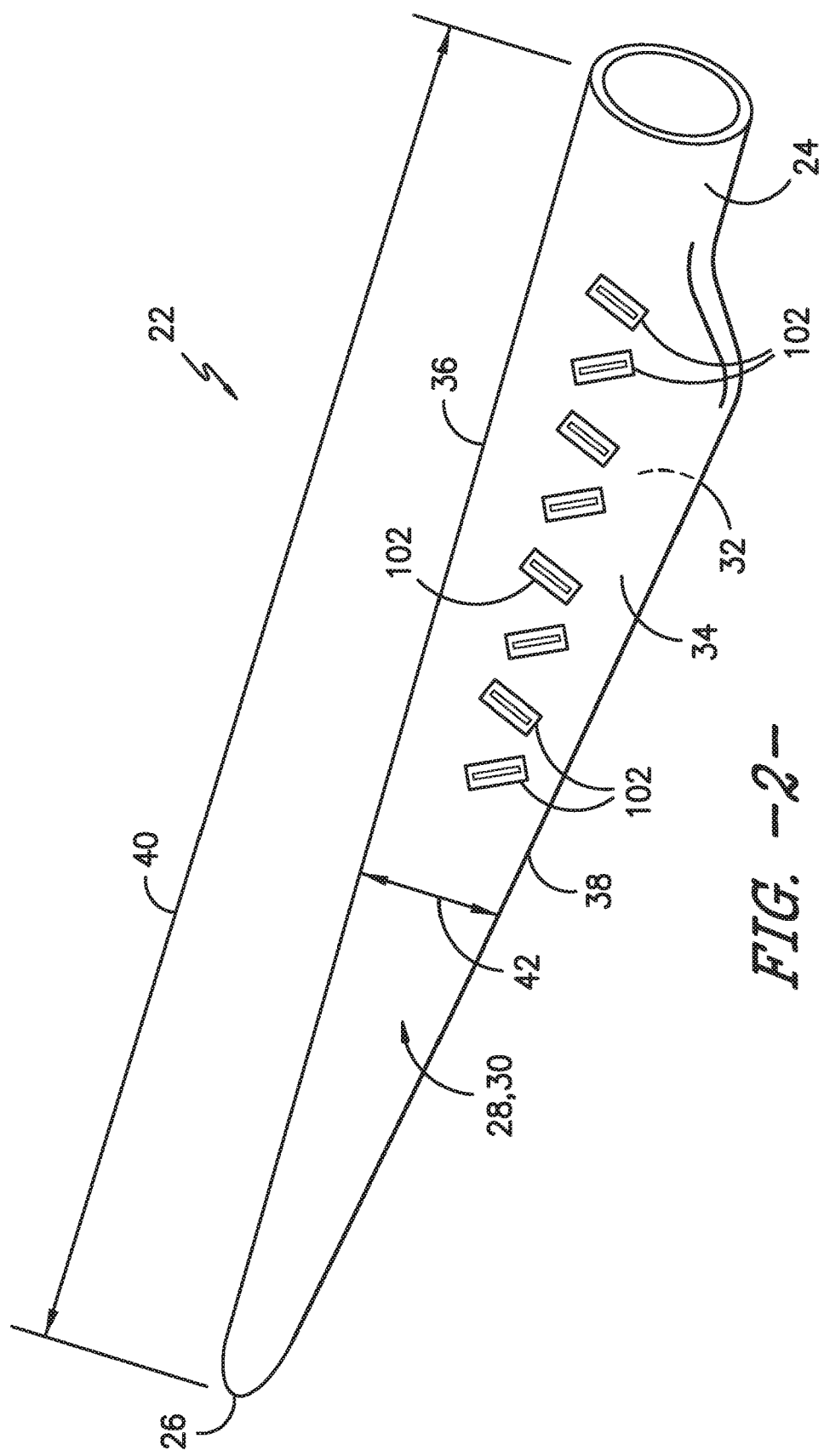
FIG. -2-

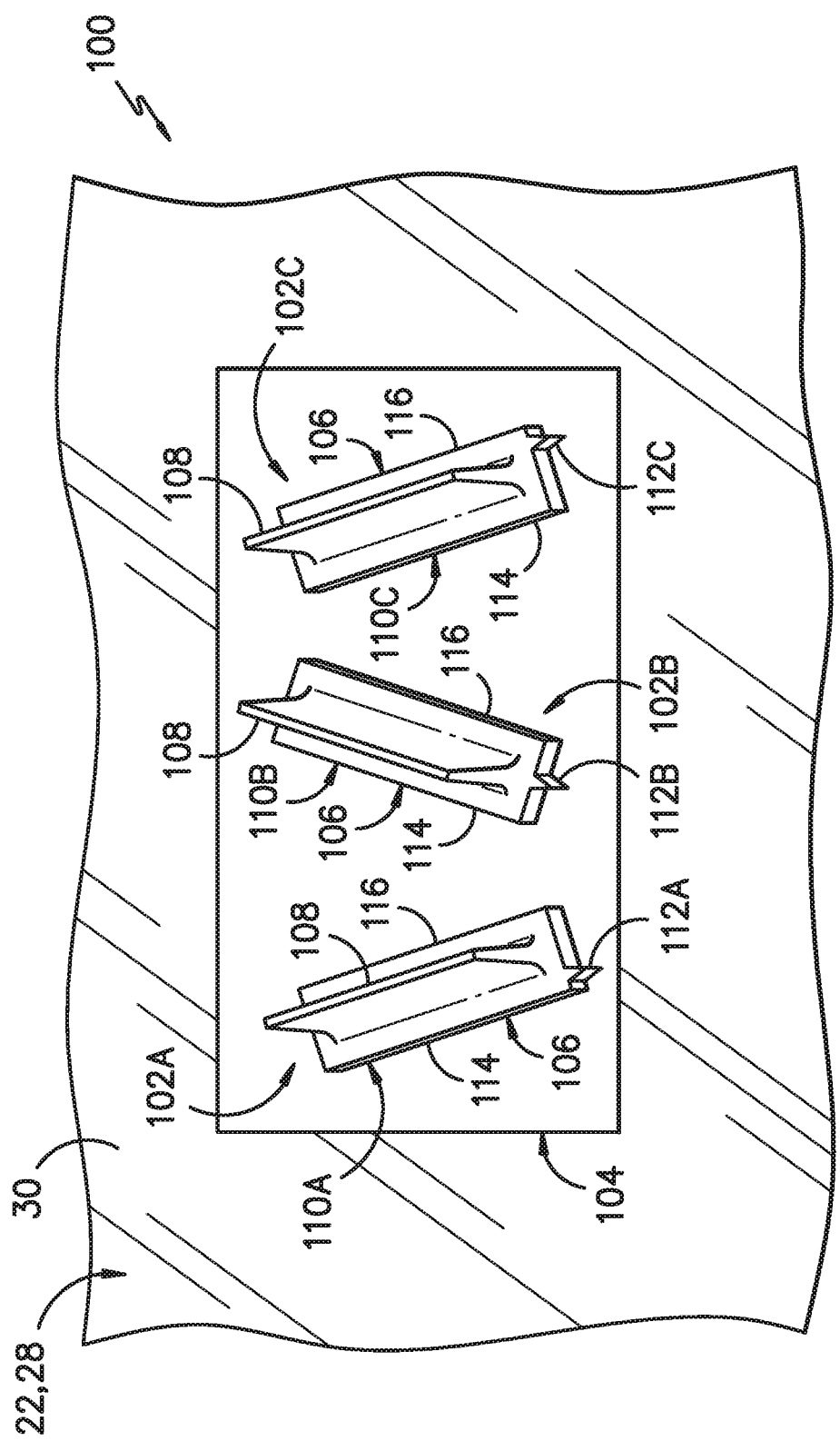

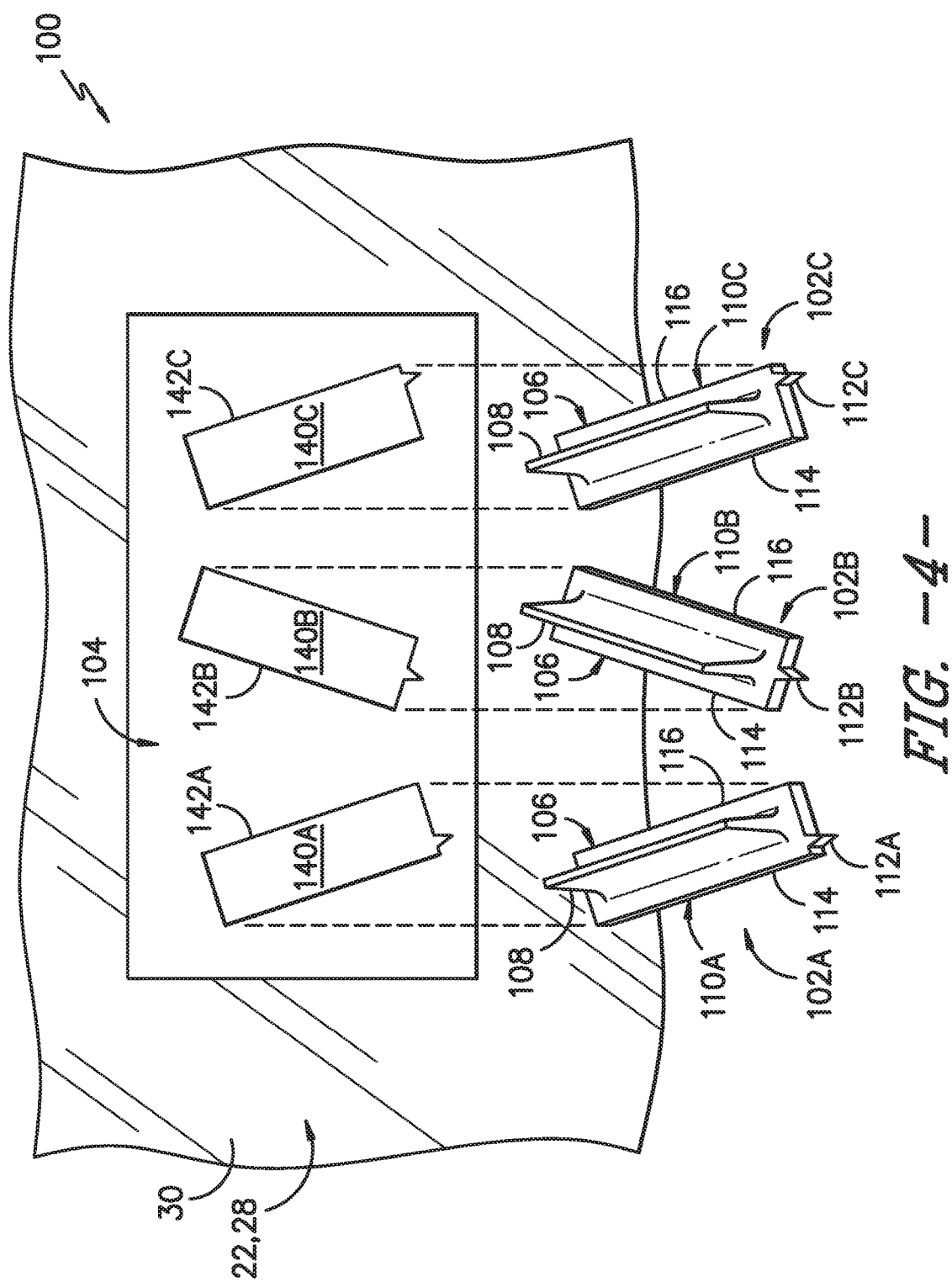
FIG. -4-

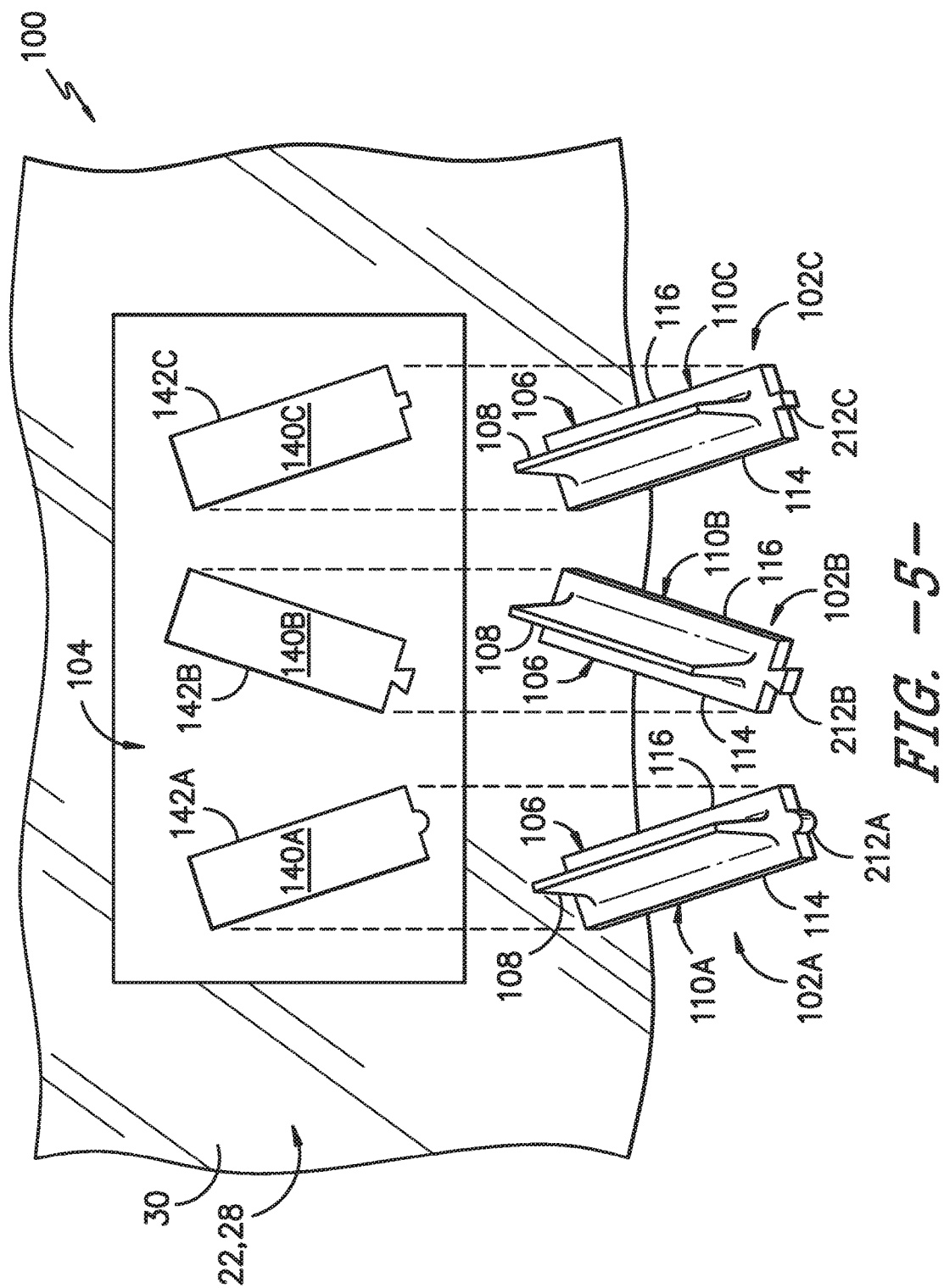

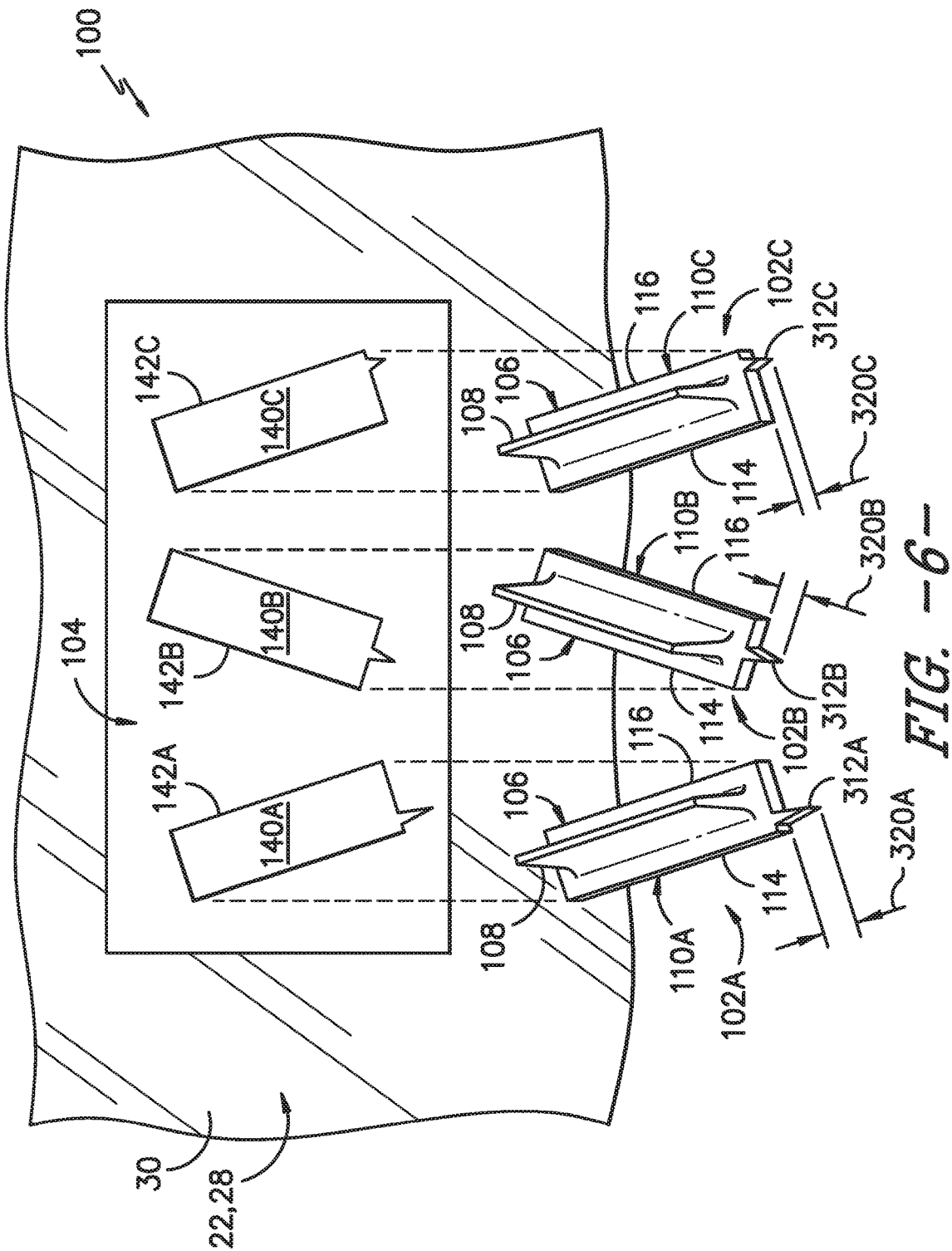

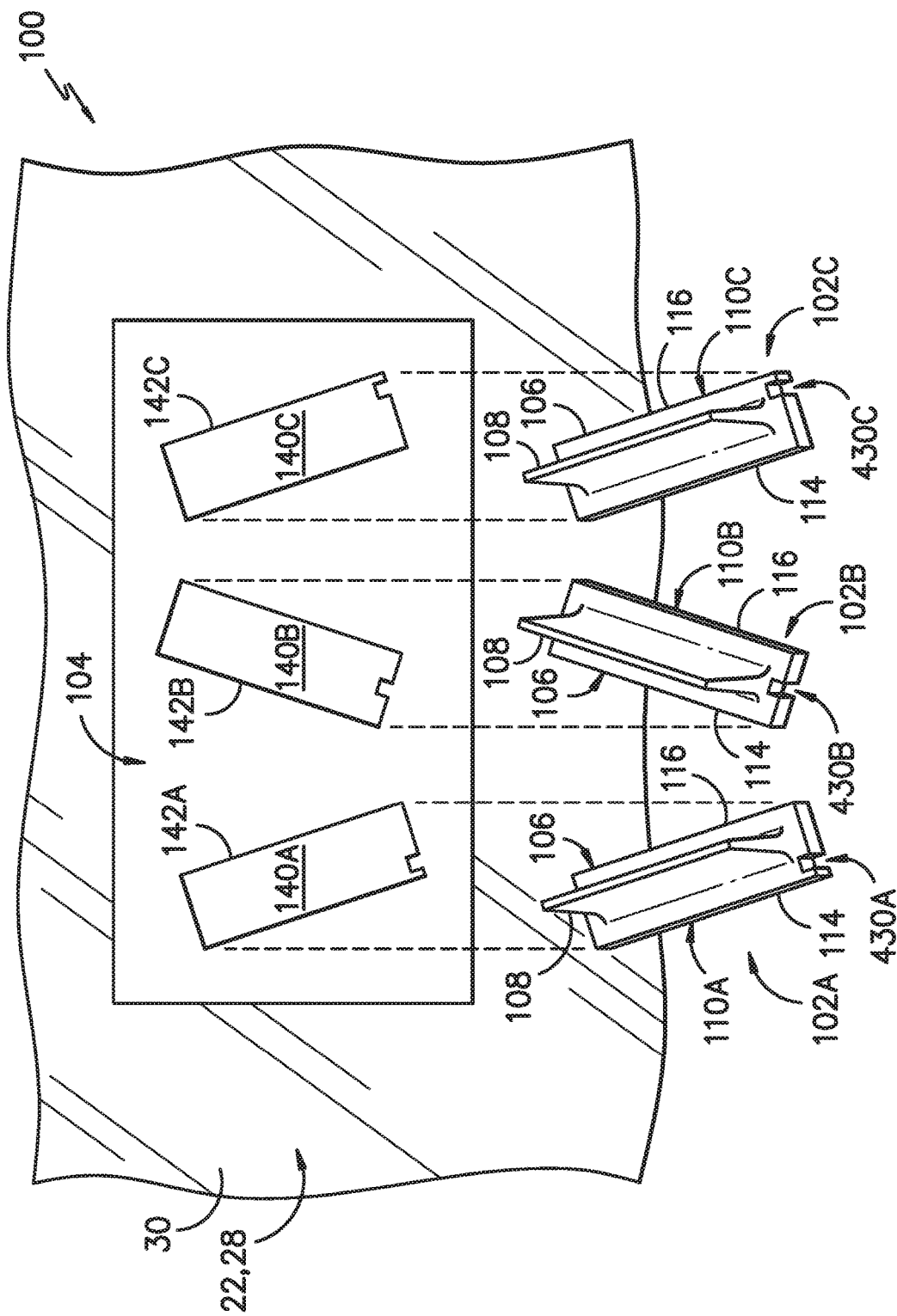
FIG. -7-

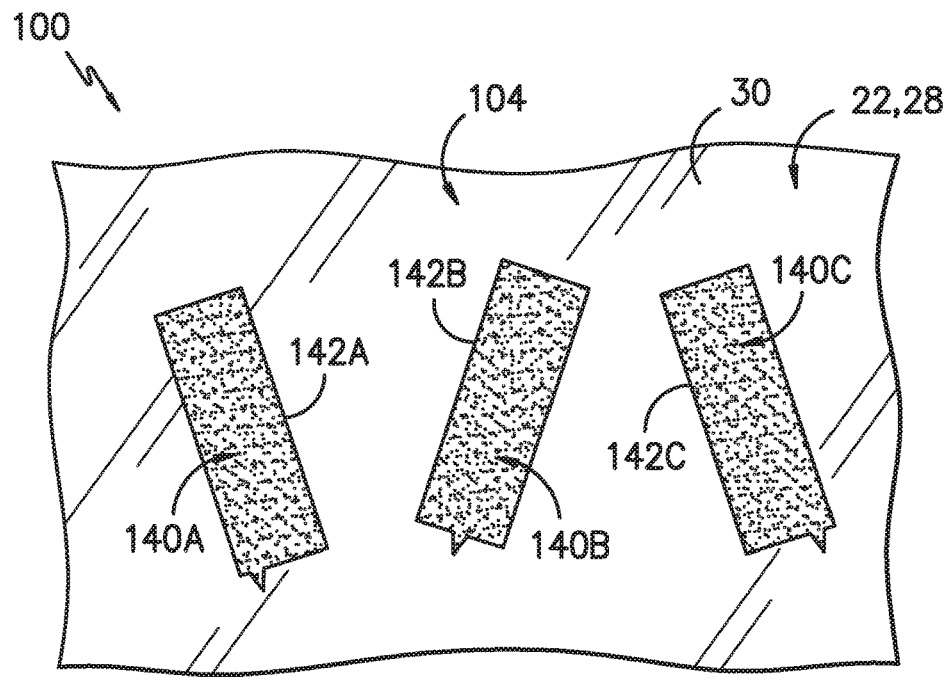
FIG. -8-
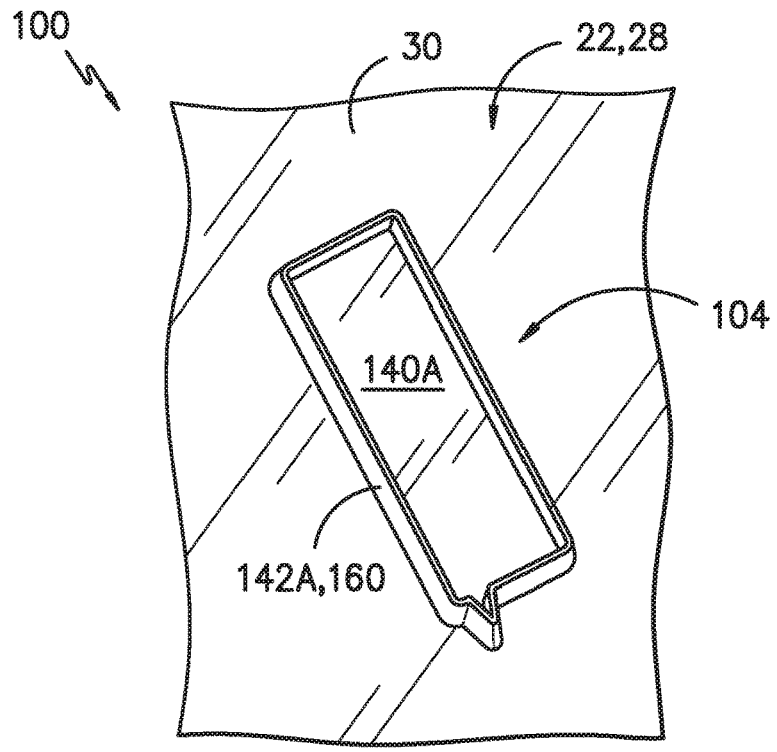
FIG. -9-

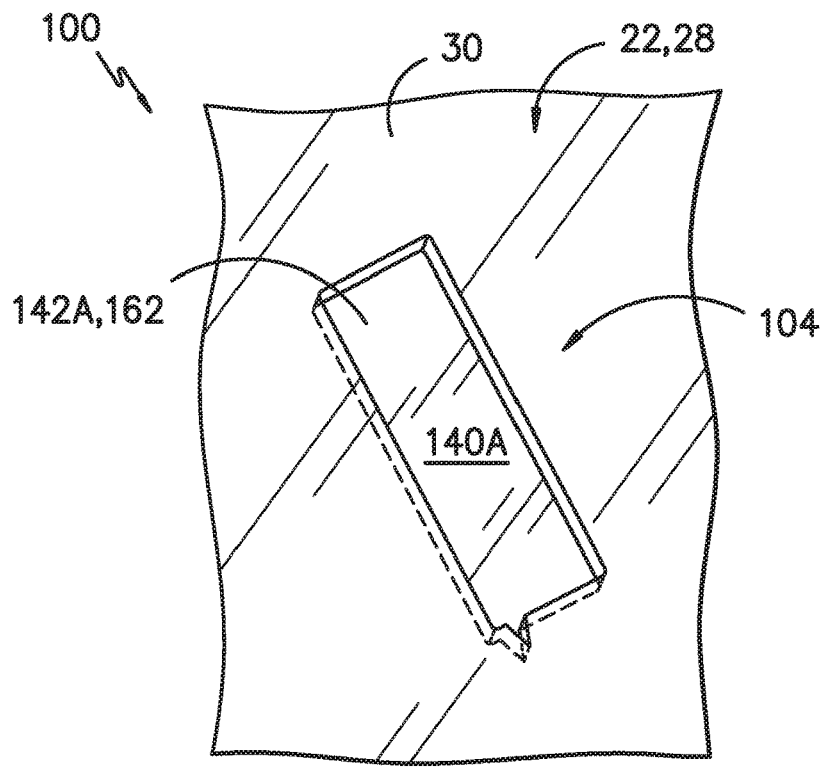
FIG. -10-
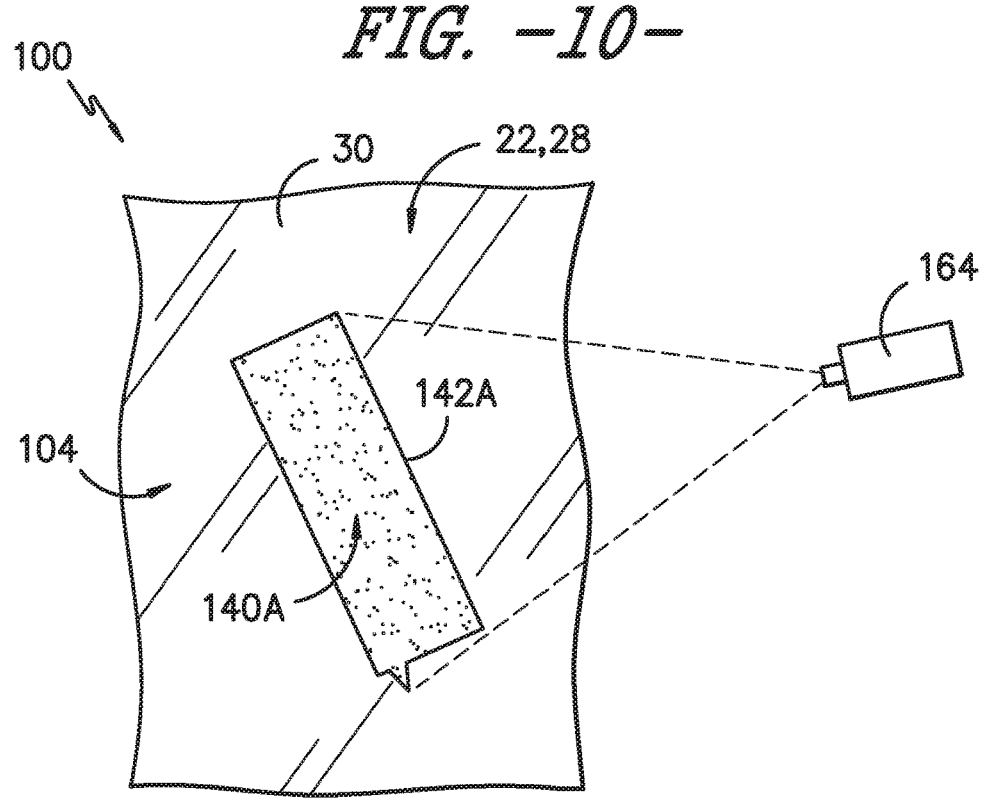
FIG. -11-

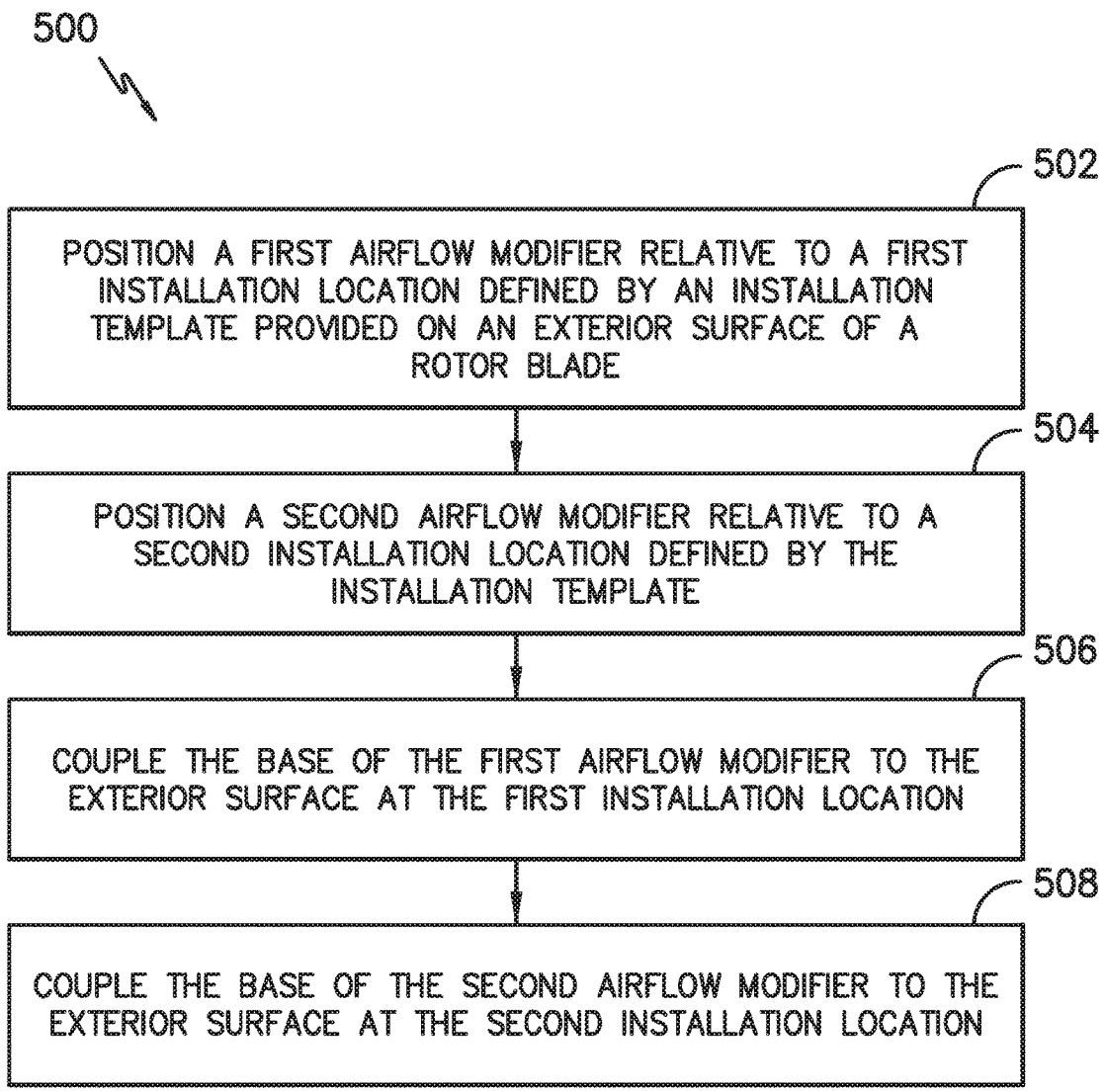
FIG. -12-

SYSTEM AND METHOD FOR LOCATING AIRFLOW MODIFIERS FOR INSTALLATION ON A WIND TURBINE ROTOR BLADE

FIELD OF THE INVENTION

The present subject matter relates generally to wind turbines and, more particularly, to a system and method for locating airflow modifiers for installation relative to an exterior surface of a wind turbine rotor blade.

BACKGROUND OF THE INVENTION

Wind power is considered one of the cleanest, most environmentally friendly energy sources presently available, and wind turbines have gained increased attention in this regard. A modern wind turbine typically includes a tower, generator, gearbox, nacelle, and one or more rotor blades. The rotor blades capture the kinetic energy of wind using known airfoil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy that may be deployed to a utility grid.

In many instances, it may be desirable to install one or more airflow modifiers on the exterior surface of a rotor blade to modify or adjust the flow of air across the blade surface. For instance, it is known to utilize vortex generators to enhance the flow of air across the exterior surface of a rotor blade, thereby delaying flow separation of the airflow from the blade. In such instances, the vortex generators are typically configured to be installed at specific locations along the exterior surface of the rotor blade. In addition, vortex generators may often be provided with different configurations, with vortex generators of a given configuration being configured to be installed at predetermined locations on the exterior surface of the rotor blade relative to vortex generators of a different configuration. As such, the process of installing the various vortex generators at the intended locations on the exterior surface of a rotor blade may often be quite challenging and time consuming.

Accordingly, an improved system and method for locating airflow modifiers, such as vortex generators, for installation relative to an exterior surface of a wind turbine rotor blade would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a system for locating airflow modifiers for installation on wind turbine rotor blades. The system may generally include a plurality of airflow modifiers, with each airflow modifier including a base defining an outer profile that differs from the outer profiles of the remainder of the airflow modifiers. The system may also include a blade shell defining an exterior surface. The base of each airflow modifier may be configured to be coupled to the exterior surface of the blade shell. In addition, the system may include an installation template provided on the exterior surface of the blade shell. The installation template may define a different installation location for each of the airflow modifiers. Moreover, the installation template may include a geometric feature at each installation location that at least partially matches the outer profile of the airflow modifier configured to be installed at such installation location.

In another aspect, the present subject matter is directed to a system for locating airflow modifiers for installation on wind turbine rotor blades. The system may include a first vortex generator including a first base that defines a first outer profile and a second vortex generator including a second base that defines a second outer profile, with the second outer profile differing from the first outer profile. The system may also include a blade shell defining an exterior surface. The first and second bases of the vortex generators may be configured to be coupled to the exterior surface of the blade shell. In addition, the system may include an installation template provided on the exterior surface of the blade shell. The installation template may define a first installation location for the first vortex generator and a second installation location for the second vortex generator. The installation template may include a first outline at the first installation location that matches the first outer profile and a second outline at the second installation location that matches the second outer profile.

In a further aspect, the present subject matter is directed to a method for locating airflow modifiers for installation on wind turbine rotor blades. The method may include positioning a first airflow modifier relative to a first installation location defined by an installation template provided on an exterior surface of a rotor blade. The first airflow modifier may include a first base defining a first outer profile. The method may also include positioning a second airflow modifier relative to a second installation location defined by the installation template. The second airflow modifier may include a second base defining a second outer profile that differs from the first outer profile. In addition, the installation template may include a first geometric feature at the first installation location that at least partially matches the first outer profile and a second geometric feature at the second installation location that at least partially matches the second outer profile. Moreover, the method may include coupling the first base of the first airflow modifier to the exterior surface at the first installation location and coupling the second base of the second airflow modifier to the exterior surface at the second installation location.

In yet another aspect, the present subject matter is directed to a vortex generator for use with a wind turbine rotor blade. The vortex generator may include a base and a wall extending outwardly from the base, with the base defining an outer profile. At least one of a shape or dimensions of the outer profile of the base may be unique to the vortex generator to allow the vortex generator to be differentiated from other vortex generators having different configurations.

In an even further aspect, the present subject matter is directed to an installation template for installing airflow modifiers onto a wind turbine rotor blade. The installation template may define a plurality of installation locations associated with installing a corresponding number of airflow modifiers onto the rotor blade. In addition, the installation template may define a geometric feature at each installation template that differs from at least one of the geometric features defined at one or more of the other installation locations.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 illustrates a side view of one embodiment of a wind turbine in accordance with aspects of the present subject matter;

FIG. 2 illustrates a perspective view of one embodiment of a rotor blade suitable for use within the wind turbine shown in FIG. 1 in accordance with aspects of the present subject matter, particularly illustrating a plurality of airflow modifiers installed on the exterior surface of the rotor blade;

FIG. 3 illustrates a close-up, perspective view of a system for locating airflow modifiers for installation relative to the exterior surface of the rotor blade in accordance with aspects of the present subject matter, particularly illustrating three airflow modifiers installed onto the exterior surface;

FIG. 4 illustrates a top view of both the airflow modifiers and the exterior surface shown in FIG. 4, particularly illustrating the airflow modifiers exploded away from the exterior surface of the rotor blade to show an installation template provided on the exterior surface;

FIG. 5 illustrates a similar top view to that shown in FIG. 4, particularly illustrating another embodiment of the airflow modifiers and a corresponding installation template in accordance with aspects of the present subject matter;

FIG. 6 illustrates a similar top view to that shown in FIG. 4, particularly illustrating a further embodiment of the airflow modifiers and a corresponding installation template in accordance with aspects of the present subject matter;

FIG. 7 illustrates a similar top view to that shown in FIG. 4, particularly illustrating yet another embodiment of the airflow modifiers and a corresponding installation template in accordance with aspects of the present subject matter;

FIG. 8 illustrates a top view of one embodiment of an installation template that may be applied onto the exterior surface of the rotor blade in accordance with aspects of the present subject matter;

FIG. 9 illustrates a perspective view of one embodiment of an installation template that may be defined by or integrated into the exterior surface of the rotor blade in accordance with aspects of the present subject matter;

FIG. 10 illustrates a perspective view of another embodiment of an installation template that may be defined by or integrated into the exterior surface of the rotor blade in accordance with aspects of the present subject matter;

FIG. 11 illustrates a perspective view of one embodiment of an installation template that may be projected onto the exterior surface of the rotor blade in accordance with aspects of the present subject matter; and FIG. 12 illustrates a flow diagram of one embodiment of a method for locating airflow modifiers for installation relative to the exterior surface of the rotor blade in accordance with aspects of the present subject matter.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to a system and method for locating airflow modifiers for installation relative to an exterior surface of a wind turbine rotor blade. Specifically, in several embodiments, airflow modifiers having a given configuration may include a unique geometric identifier that is configured to be matched to a corresponding geometric feature defined by an installation template provided on the exterior surface of the rotor blade. For example, as will be described below, each airflow modifier may include a base defining an outer profile, with the shape and/or dimensions of the outer profiles of the airflow modifiers having a given configuration differing from the shape and/or dimensions of the outer profiles of the airflow modifiers having differing configurations. Additionally, in one embodiment, the installation template may include an outline at each installation location that is configured to match the outer profile of the base of the airflow modifier configured to be installed at such location. Accordingly, by matching each airflow modifier to its corresponding location on the installation template, the airflow modifiers may be accurately located on the rotor blade.

It should be appreciated that, although the airflow modifiers will be primarily described herein as corresponding to vortex generators, each airflow modifier may, in general, correspond to any suitable surface feature or blade add-on component that is configured to directly or indirectly modify the flow of air flowing adjacent to and/or over at least a portion of the exterior surface of a rotor blade. For instance, as an alternative to vortex generators, the airflow modifiers may correspond to spoilers, noise reducers, root enhancers, and/or the like.

Referring now to the drawings, FIG. 1 illustrates a side view of one embodiment of a wind turbine 10. As shown, the wind turbine 10 generally includes a tower 12 extending from a support surface 14 (e.g., the ground, a concrete pad or any other suitable support surface). In addition, the wind turbine 10 may also include a nacelle 16 mounted on the tower 12 and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, the hub 20 may be rotatably coupled to an electric generator (not shown) positioned within the nacelle 16 to permit electrical energy to be produced.

Referring now to FIG. 2, a perspective view of one embodiment of a rotor blade 22 suitable for use within the wind turbine 10 shown in FIG. 1 is illustrated in accordance with aspects of the present subject matter. As shown, the rotor blade 22 generally includes a blade root 24 configured to be mounted or otherwise secured to the hub 20 (FIG. 1) of the wind turbine 10 and a blade tip 26 disposed opposite the blade root 24. Additionally, the rotor blade 22 includes a blade shell 28 extending between the blade root 24 and the blade tip 26 along a longitudinal or spanwise axis (not shown) of the blade 22.

In general, the blade shell 28 may serve as the outer casing/covering of the rotor blade 22 and, thus, may define an outer or exterior surface 30 of the rotor blade 22. In addition, the blade shell 28 may define a substantially aerodynamic profile, such as by defining a symmetrical or cambered airfoil-shaped cross-section. For example, the blade shell 28 may define a pressure side 32 and a suction side 34 extending between leading and trailing edges 36, 38 of the rotor blade 22. Further, the rotor blade 22 may also have a span 40 defining the total length between the blade root 24 and the blade tip 26 and a chord 42 defining the total length between the leading edge 36 and the trailing edge 38. As is generally understood, the chord 42 may generally vary in length with respect to the span 40 as the rotor blade 22 extends from the blade root 24 to the blade tip 26.

In several embodiments, the blade shell 28 of the rotor blade 22 may be formed from a plurality of shell components or sections. For example, in one embodiment, the blade shell 28 may be manufactured from a first shell half or section generally defining the pressure side 32 of the rotor blade 22 and a second shell half or section generally defining the suction side 34 of the rotor blade 22, with such shell sections being secured to one another at the leading and trailing edges 36, 38 of the blade 22. Alternatively, the blade shell 28 may be formed from any other suitable number and/or arrangement of shell sections. For instance, in one embodiment, the blade shell 28 may be segmented along the longitudinal axis of the rotor blade 22, with each spanwise segment being formed from one or more shell sections.

Additionally, the blade shell 28 may generally be formed from any suitable material. For instance, in one embodiment, the blade shell 28 may be formed entirely from a laminate composite material, such as a carbon fiber reinforced laminate composite or a glass fiber reinforced laminate composite. Alternatively, one or more portions of the blade shell 28 may be configured as a layered construction and may include a core material, formed from a lightweight material such as wood (e.g., balsa), foam (e.g., extruded polystyrene foam) or a combination of such materials, disposed between layers of laminate composite material.

It should be appreciated that the rotor blade 22 may also include one or more longitudinally extending structural components (not shown) configured to provide increased stiffness, buckling resistance and/or strength to the blade 22. For example, the rotor blade 22 may include a pair of longitudinally extending spar caps (not shown) configured to be engaged against opposing inner surfaces of the pressure and suction sides 32, 34 of the body shell 28. Additionally, one or more shear webs (not shown) may be disposed between the spar caps to form a beam-like configuration.

As shown in FIG. 2, the rotor blade 22 may also include a plurality of airflow modifiers 102 installed along its exterior surface 30. In general, each airflow modifier 102 may correspond to any suitable surface feature or blade add-on component that is configured to directly or indirectly modify the flow of air flowing adjacent to and/or over at least a portion of the exterior surface 30 of the rotor blade 22. For instance, in the illustrated embodiment, the airflow modifiers 102 correspond to vortex generators installed onto the rotor blade 22 at a plurality spaced apart locations along the exterior surface 30 of the blade 22. As is generally understood, the vortex generators may be configured to enhance the flow of air across the exterior surface 30, thereby delaying flow separation of the airflow from the rotor blade 22 and increasing the lift generated by the blade 22. In another embodiment, the airflow modifiers 102 may correspond to spoilers configured to separate the flow of air from the exterior surface 30 of the rotor blade 22, thereby reducing both the lift generated by the blade 22 and the loads acting on the blade 22. In other embodiments, the airflow modifiers 102 may correspond to any other suitable surface features and/or add-on components, such as noise reducers, root enhancers, and/or the like.

As shown in FIG. 2, the airflow modifiers 102 may be configured to be coupled to the exterior surface 30 of the rotor blade 22. In several embodiments, each airflow modifier 102 may be configured to be positioned at a predetermined location on the exterior surface 30 relative to a given feature(s) of the rotor blade 22 (e.g., relative to the root 24, tip 26, leading edge 36, trailing edge 38, etc.) and/or relative to the other airflow modifiers 102 in order to maximize or enhance the performance of the airflow modifiers 102 as installed on the blade 22. For instance, each airflow modifier 102 may be configured to be positioned at a fixed distance and/or a fixed orientation relative to the airflow modifiers 102 immediately adjacent to such airflow modifier 102. As will be described in detail below, the present subject matter is generally directed to a system and method for accurately locating airflow modifiers 102 for installation relative to the exterior surface 30 of a rotor blade 22, thereby allowing the airflow modifiers 102 to be consistently placed at their intended locations on the blade 22.

Referring now to FIGS. 3 and 4, one embodiment of a system 100 for locating airflow modifiers 102 for installation relative to the exterior surface 30 of a rotor blade 22 is illustrated in accordance with aspects of the present subject matter. Specifically, FIG. 3 illustrates a perspective view of a plurality of airflow modifiers 102 (e.g., vortex generators 102A, 102B, 102C) installed relative to the exterior surface 30 of a rotor blade 22. Additionally, FIG. 4 illustrates a top view of both the airflow modifiers 102 and the exterior surface 30 of the rotor blade 22 shown in FIG. 3, particularly illustrating the airflow modifiers 102 exploded away from the exterior surface 30 to show the details of an installation template 104 provided on the exterior surface 30.

As shown in FIGS. 3 and 4, each airflow modifier 102 corresponds to a vortex generator 102A, 102B, 102C. Specifically, in the illustrated embodiment, the rotor blade 22 includes a first vortex generator 102A, a second vortex generator 102B, and a third vortex generator 102C installed on its exterior surface 30. However, in other embodiments, the rotor blade 22 may include any other suitable number of vortex generators installed on its exterior surface 30, including less than three vortex generators or greater than three vortex generators. As indicated above, it should also be appreciated that, in other embodiments, the airflow modifiers 102 may correspond to any other suitable surface features and/or blade add-on components.

As particularly shown in FIG. 3, each vortex generator 102A, 102B, 102C includes a base 106 configured to be coupled to the exterior surface 30 of the rotor blade 22 (e.g., via tape, adhesives, and/or the like) and a vortex generator wall 108 extending outwardly from the base 106 in a direction away from the exterior surface 30. In several embodiments, each vortex generator 102A, 102B, 102C may have a configuration that differs from the configuration of one or more of the other vortex generators, thereby allowing the vortex generators 102A, 102B, 102C to have varied airflow modifying properties. For instance, in one embodiment, the vortex generator wall 108 of each vortex generator 102A, 102B, 102C may define a slightly different shape, thickness and/or height than the vortex generator walls 108 of the other vortex generators 102A, 102B, 102C.

In accordance with aspects of the present subject matter, to allow the vortex generators 102A, 102B, 102C having differing configurations to be easily identified and distinguished from one another and to facilitate proper installation of the vortex generators 102A, 102B, 102C onto the rotor blade 22, the base 106 of each vortex generator 102A, 102B, 102C may define an outer profile 110A, 110B, 110C that is unique to vortex generators of a given configuration. For instance, in the illustrated embodiment, each vortex generator 102A, 102B, 102C may have a slightly different configuration, such as by configuring each vortex generator wall 108 to have a slightly different shape, thickness and/or height. In such instance, the base 106 of each vortex generator 102A, 102B, 102C may define an outer profile 110A, 110B, 110C that differs from the outer profiles of the bases of the other vortex generators. Such differing base profiles 110A, 110B, 110C may provide a means for visually differentiating the various different vortex generators 102A, 102B, 102C. Specifically, if the bases 106 of two separate vortex generators define the same outer profile, it can be assumed that the vortex generators have the same configuration (e.g., by having the same part or design number). However, if the bases 106 of two separate vortex generators define different outer profiles, it can be assumed that the vortex generators have differing configurations (e.g., by having different part or design numbers). Such visual identifying means can be particularly advantageous when the differences in configuration between each vortex generator 102A, 102B, 102C is slight or otherwise difficult to detect by visually comparing the vortex generators.

In several embodiments, the unique geometric identifiers provided to the vortex generators 102A, 102B, 102C may be defined by variations in the size and/or shape of the outer profile 110A, 110B, 110C of the base 106 of each vortex generator 102A, 102B, 102C. For instance, in one embodiment, for each vortex generator 102A, 102B, 102C having a given configuration, the base 106 of such vortex generator 102A, 102B, 102C may define dimensions (e.g., a length and/or width) that differ from the dimensions of the bases 106 of any vortex generators 102A, 102B, 102C having a different configuration. In another embodiment, the specific shape of the outer profile 110A, 110B, 110C of each base 106 may be varied to provide the various different vortex generators 102A, 102B, 102C with unique geometric identifiers. For instance, as will be described below, each base 106 may, in several embodiments, include a geometric feature that serves to differentiate its outer profile 110A, 110B, 110C from the outer profiles of the other bases.

As particularly shown in FIGS. 3 and 4, in one embodiment, the outer profiles 110A, 110B, 110C may be varied by configuring each vortex generator 102A, 102B, 102C to include a positive geometric feature or projection 112A, 112B, 112C extending outwardly from its base 106. In such an embodiment, the relative location, shape and/or size of the projections 112A, 112B, 112C may be varied, as desired, to provide unique geometric identifiers for the vortex generators 102A, 102B, 102C. For instance, in the illustrated embodiment, each projection 112A, 112B, 112C defines a triangular shape of generally the same size. However, the relative locations of the projections 112A, 112B, 112C on the bases 106 have been varied to differentiate the outer profiles 110A, 110B, 110C of the vortex generators 102A, 102B, 102C. Specifically, as shown in FIGS. 3 and 4, the first vortex generator 102A includes a triangular-shaped projection 112A that extends outwardly from the end of its base 106 at a location closer to a first side 114 of the base 106 than an opposed second side 116 of the base 106 while the third vortex generator 102C includes a triangular-shaped projection 112C that extends outwardly from the end of its base 106 at a location closer to the second side 116 of the base 106 than the opposed first side 114 of the base 106. Similarly, the second vortex generator 102B includes a triangular-shaped projection 112B that extends outwardly from the end of its base 106 at a more central location defined between the first and second sides 114, 116 of the base 106.

It should be appreciated that, in other embodiments, the specific configuration of each projection may be varied in any other manner that allows for the outer profiles 110A, 110B, 110C of the bases 106 to be visually differentiated. For instance, as shown in the alternative embodiment of FIG. 5, the base 106 of each vortex generator 102A, 102B, 102C includes a projection 212A, 212B, 212C defining a different shape. Specifically, the first vortex generator 102A includes a semi-circular-shaped projection 212A that extends outwardly from the end of its base 106 at a location closer to the first side 114 of the base 106 than the opposed second side 116 of the base 106 while the third vortex generator 102C includes a rectangular-shaped projection 212C that extends outwardly from the end of its base 106 at a location closer to the second side 116 of the base 106 than the opposed first side 114 of the base 106. Similarly, the second vortex generator 102B includes a trapezoidal-shaped projection 212B that extends outwardly from the end of its base 106 at a more central location defined between the first and second sides 114, 116 of the base 106. In another embodiment, the base 106 of each vortex generator 102A, 102B, 102C may include a projection defining a unique size or dimensions. For instance, as shown in the alternative embodiment of FIG. 6, in addition to being provided at varied locations, the vortex generators 102A, 102B, 102C include triangular-shaped projections 312A, 312B, 312C defining varied sizes. For instance, the projection 312A of the first vortex generator 102A defines a length 320A that is greater than the lengths 320B, 320C of the projections 312B, 312C of the second and third vortex generators 102B, 120C, with the length 312B of the second vortex generator 102B being greater than the length 312C of the third vortex generator 102C. It should be appreciated that the various base projections described herein may generally be provided with any suitable combination of differing locations, shapes, and/or sizes to allow the outer profiles 110A, 110B, 110C of the vortex generators 102A, 102B, 102C to be varied as desired.

In yet another embodiment, the outer profiles 110A, 110B, 110C of the vortex generators 102A, 102B, 102C may be varied by configuring each vortex generator to include a negative geometric feature or recess defined in its base 106. In such an embodiment, similar to the projections described above, the relative locations, shapes and/or sizes of the recesses may be varied, as desired, to provide unique geometric identifiers for the vortex generators 102A, 102B, 102C. For instance, as shown in the alternative embodiment of FIG. 7, the first vortex generator 112A includes a rectangular-shaped recess 430A defined in its base 106 at a location closer to the first side 114 of the base 106 than the opposed second side 116 of the base 106 while the third vortex generator 102C includes a rectangular-shaped recess 430C defined in its base 106 at a location closer to the second side 116 of the base 106 than the opposed first side 114 of the base 106. Similarly, the second vortex generator 112B includes a rectangular-shaped recess 430B defined in its base 106 at a more central location between the first and second sides 114, 116 of the base 106. In other embodiments, the shapes and/or sizes of the recesses 430A, 430B, 430C may be similarly varied in addition to (or as an alternative to) the variations in the relative locations of the recesses.

Referring back to FIGS. 3 and 4, as indicated above, the disclosed system 100 may also include an installation template 104 provided on the exterior surface 30 of the rotor blade 22. In several embodiments, the installation template 104 may provide a means for matching each vortex generator 102A, 102B, 102C to its predetermined installation location on the rotor blade 22. For instance, as shown in FIG. 4, the installation template 104 may identify a different installation location 140A, 140B, 140C for each vortex generator 102A, 102B, 102C, such as a first installation location 140A for the first vortex generator 102A, a second installation location 140B for the second vortex generator 102B and a third installation location 140C for the third vortex generator 102C. Additionally, in accordance with aspects of the present subject matter, the installation template 104 may include a geometric feature at each installation location 140A, 140B, 140C that at least partially matches or is otherwise associated with the outer profile 110A, 110B, 110C of the specific vortex generator 102A, 102B, 102C configured to be installed at such installation location. As such, by matching the outer profile 110A, 110B, 110C of each vortex generator 102A, 102B, 102C to its corresponding geometric feature provided on the installation template 104, the vortex generators may be properly positioned on the exterior surface 30 of the rotor blade 22 at their desired locations 140A, 140B, 140C relative to the blade 22 and/or one another.

As shown in FIG. 4, in one embodiment, the geometric feature defined at each installation location 140A, 140B, 140C may correspond to a geometric outline 142A, 142B, 142C of the outer profile 110A, 110B, 110C of the vortex generator 102A, 102B, 102C configured to be installed at such location. For instance, the installation template 104 may define a first geometric outline 142A having a shape configured to match the shape of the outer profile 110A of the base 106 of the first vortex generator 102A (e.g., by defining an outline that is substantially rectangular-shaped with a triangular-shaped projection extending outwardly from the appropriate relative location). Similarly, the installation template 104 may define both a second geometric outline 142B having a shape configured to match the shape of the outer profile 110B of the base 106 of the second vortex generator 102B and a third geometric outline 142C having a shape configured to match the shape of the outer profile 110C of the base 106 of the third vortex generator 102C.

It should be appreciated that the installation templates 104 shown in the alternative embodiments of FIGS. 5-7 may similarly include geometric features configured to match the outer profiles 110A, 110B, 110C of the corresponding vortex generators 102A, 102B, 102C. For instance, as shown in FIGS. 5-7, each installation template 104 includes first, second, and third geometric outlines 142A, 142B, 142C having shapes configured to match the shapes of the outer profiles 110A, 110B, 110C of the bases 106 of the first, second, and third vortex generators 102A, 102B, 102C, shown in the various different embodiments.

It should also be appreciated that each geometric outline 142A, 142B, 142C defined by the installation template 104 may not only provide a means for identifying the intended installation location 140A, 140B, 140C for each corresponding vortex generator 102A, 102B, 102C, but may also serve as a means for identifying the orientation at which the vortex generator is configured to be installed on the exterior surface 30 relative to the rotor blade 22 and/or any adjacent vortex generators. For instance, as shown in the illustrated embodiment, each geometric outline 142A, 142B, 142C may be provided at a specific orientation to ensure that the corresponding vortex generator 102A, 120B, 102C is installed at the proper location and at the proper orientation on the rotor blade 22.

In several embodiments, the installation template 104 may correspond to a separate component configured to be separately placed on or coupled to the exterior surface 30 of the rotor blade 22. For instance, in the embodiments shown in FIGS. 4-7, the installation template 104 corresponds to a flat or planar sheet of material (e.g., a paper, metal or plastic template) that may be simply placed onto the exterior surface 30 of the rotor blade 22 or coupled to the exterior surface 30 of the blade 22 (e.g., via tape or adhesives). In such an embodiment, the geometric outlines 142A, 142B, 142C defined by the installation template 104 may, for example, correspond to cut-outs of the sheet of material. Thereafter, once the various vortex generators 102A, 102B, 102C have been secured to the exterior surface 30 of the rotor blade 22 using the installation template 104, the template 104 may be removed from the exterior surface 30.

In another embodiment, the installation template 104 may be configured to be applied onto the exterior surface 33 of the rotor blade 22. For instance, as shown in FIG. 8, the geometric outlines 142A, 142B, 142C for the installation template 104 may be painted onto the exterior surface 30. In such an embodiment, each outline 142A, 142B, 142C may be completely filled-in with paint (e.g., as shown in FIG. 8) or the outlines 142A, 142B, 142C may only be represented by a painted borderline. As an alternative to painting the geometric outlines 142A, 142B, 142C of the installation template 104 onto the exterior surface 30, installation template 104 may be provided as an outer coating on the exterior surface 30. For instance, in one embodiment, the geometric outlines 142A, 142B, 142C may be formed by applying a pigmented gelcoat or any other suitable coating onto the exterior surface 30.

In a further embodiment, the installation template 104 may be defined by physical features formed on or integrated into the exterior surface 30 of the rotor blade 22. For instance, as shown in FIG. 9, the exterior surface 30 of the rotor blade 22 may include an outwardly projecting rib 160 that defines each geometric outline 142A, 142B, 142C of the installation template 104 (only one of which is shown in FIG. 9). In such an embodiment, each rib 160 may, for example, be formed by creating an appropriately shaped mold mark in the blade mold used to form the rotor blade 22. Alternatively, as shown in FIG. 10, the exterior surface 30 may include a recessed area 162 that defines geometric outline 142A, 142B, 142C of the installation template 104 (only one of which is shown in FIG. 10). In such an embodiment, each recessed area 162 may, for example, be formed by inserting an appropriately shaped mold insert into the blade mold used to form the rotor blade 22 or by machining out the recessed area 162 post-manufacturing of the rotor blade 22.

In yet another embodiment, the installation template 104 may be configured to be projected onto the exterior surface 30 of the rotor blade 22. For instance, as shown in FIG. 11, a suitable lighting device 164 may be used to project each geometric outline 142A, 142B, 142C of the installation template 104 (only one of which is shown in FIG. 11) onto the exterior surface 30 of the rotor blade 22. The lighting device 164 may, for example, correspond to a laser light source having a miniature version of the desired installation template provided therein to allow a laser projection of the installation template 104 to be displayed on the exterior surface 30 of the rotor blade 22.

Referring now to FIG. 12, a flow diagram of one embodiment of a method 500 for locating airflow modifiers for installation on wind turbine rotor blades is illustrated in accordance with aspects of the present subject matter. In general, the method 500 will be described herein with reference to the system 100 described above with reference to FIGS. 3-11. However, it should be appreciated that the disclosed method 500 may also be utilized with any other suitable system to allow for the accurate locating of airflow modifiers onto the exterior surface of a rotor blade. In addition, although FIG. 12 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 12, at (502) and (504), the method 500 may include positioning a first airflow modifier relative to a first installation location defined by an installation template provided on an exterior surface of a rotor blade and positioning a second airflow modifier relative to a second installation location defined by the installation template. For example, as indicated above, each airflow modifier 102 may include a base 106 defining a unique outer profile. Thus, with reference to the embodiment of the method 500 shown in FIG. 12, the first airflow modifier may include a base defining a first outer profile and the second airflow modifier may include a base defining a second outer profile that differs from the first outer profile. Moreover, as indicated above, the installation template 104 may define predetermined installation locations for the airflow modifiers and may also include a geometric feature at each installation location that at least partially matches the outer profile of the airflow modifier configured to be installed at such location. Thus, with reference to the embodiment of the method 500 shown in FIG. 12, the installation template may include both a first geometric feature at the first installation location that at least partially matches the first outer profile and a second geometric feature at the second installation location that at least partially matches the second outer profile.

Additionally, at (506) and (508), the method 500 may include coupling the base of the first airflow modifier to the exterior surface at the first installation location and coupling the base of the second airflow modifier to the exterior surface at the second installation location. As indicated above, the bases 106 of the airflow modifiers 102 may be coupled to the exterior surface 30 of the rotor blade 22 at their desired installation locations using any suitable means. For instance, in one embodiment, the bases 106 of the airflow modifiers 102 may be coupled to the exterior surface 30 using any suitable tape(s) and/or any suitable adhesive(s).

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A system for locating airflow modifiers for installation on wind turbine rotor blades, the system comprising:
   a plurality of airflow modifiers, each airflow modifier including a base having an outer wall extending around an outer perimeter of the base and a projection extending outwardly from the outer wall, the projection for each airflow modifier being positioned at a different location around the outer perimeter of the base than the projections of the remainder of the airflow modifiers such that each airflow modifier defines an outer profile around its outer perimeter that differs from the outer profiles of the remainder of the airflow modifiers;
   a blade shell defining an exterior surface, the base of each airflow modifier being configured to be coupled to the exterior surface of the blade shell; and
   an installation template provided on the exterior surface of the blade shell, the installation template defining a different installation location for each of the airflow modifiers, the installation template including a geometric feature at each installation location that at least partially matches the outer profile of the airflow modifier configured to be installed at such installation location.

2. The system of claim 1, wherein each geometric feature corresponds to an outline of the outer profile of the base of the airflow modifier configured to be installed at the corresponding installation location.

3. The system of claim 1, wherein the projection for each airflow modifier further differs with reference to at least one of shape or size of the projection relative to the projections of the remainder of the airflow modifiers.

4. The system of claim 1, wherein the installation template is at least partially defined by physical features formed on or integrated into the exterior surface of the blade shell.

5. The system of claim 1, wherein the installation template is configured to be installed or applied onto the exterior surface of the blade shell.

6. The surface of claim 1, wherein the installation template is configured to be projected onto the exterior surface of the blade shell.

7. The system of claim 1, each airflow modifier corresponds to a vortex generator.

8. A system for locating airflow modifiers for installation on wind turbine rotor blades, the system comprising:
   a first vortex generator including a first base, the first base including a first outer wall extending around an outer perimeter of the first base and a first projection extending outwardly from the first outer wall at a first location around the outer perimeter of the first base such that the first vortex generator defines a first outer profile;
   a second vortex generator including a second base, the second base including a second outer wall extending around an outer perimeter of the second base and a second projection extending outwardly from the second outer wall at a second location around the outer perimeter of the second base that differs from the first location such that the second vortex generator defines a second outer profile, the second outer profile differing from the first outer profile;
   a blade shell defining an exterior surface, the first and second bases being configured to be coupled to the exterior surface of the blade shell; and an installation template provided on the exterior surface of the blade shell, the installation template defining a first installation location for the first vortex generator and a second installation location for the second vortex generator, the installation template including a first outline at the first installation location that matches the first outer profile and a second outline at the second installation location that matches the second outer profile.

9. The system of claim 8, wherein the first projection further differs from the second projection with reference to at least one of shape or size.

10. The system of claim 8, wherein the installation template is configured to be installed or applied onto the exterior surface of the blade shell.

11. A method for locating airflow modifiers for installation on wind turbine rotor blades, the method comprising:
positioning a first airflow modifier relative to a first installation location defined by an installation template provided on an exterior surface of a rotor blade, the first airflow modifier including a first base having a first outer wall extending around an outer perimeter of the first base and a first projection extending outwardly from the first outer wall at a first location around the outer perimeter of the first base such that the first airflow modifier defines a first outer profile, the installation template including a first geometric feature at the first installation location that at least partially matches the first outer profile;
positioning a second airflow modifier relative to a second installation location defined by the installation template, the second airflow modifier including a second base having a second outer wall extending around an outer perimeter of the second base and a second projection extending outwardly from the second outer wall at a second location around the outer perimeter of the second base that differs from the first location such that the second airflow modifier defines a second outer profile, the second outer profile differing from the first outer profile, the installation template including a second geometric feature at the second installation location that at least partially matches the second outer profile;
coupling the first base of the first airflow modifier to the exterior surface at the first installation location; and
coupling the second base of the second airflow modifier to the exterior surface at the second installation location.

12. The method of claim 11, wherein the first geometric feature corresponds to an outline of the first outer profile of the first base and the second geometric feature corresponds to an outline of the second outer profile of the second base.

13. The method claim 11, wherein the first projection further differs from the second projection with reference to at least one of shape or size.

14. The method of claim 11, wherein the installation template is at least partially defined by physical features formed on or integrated into the exterior surface of the blade shell.

15. The method of claim 11, wherein the installation template is configured to be installed or applied onto the exterior surface of the blade shell.

16. The method of claim 11, wherein the installation template is configured to be projected onto the exterior surface of the blade shell.

17. The method of claim 11, wherein each of the first and second airflow modifiers corresponds to a vortex generator.

* * * * *